United States Patent [19]

Kubo et al.

[11] 3,860,956

[45] Jan. 14, 1975

[54] COLOR TARGET AND METHOD OF MANUFACTURING SAME

[75] Inventors: Shuji Kubo; Tohru Itoh, both of Kawasaki, Japan

[73] Assignee: Matsushita Electric Industrial Co., Ltd., Osaka, Japan

[22] Filed: Mar. 16, 1973

[21] Appl. No.: 341,896

[30] Foreign Application Priority Data

Mar. 17, 1972 Japan .............................. 47-27762

Nov. 10, 1972 Japan .............................. 47-113361

[52] U.S. Cl. .............................. 358/48, 178/7.1

[51] Int. Cl. .............................. H04n 9/06

[58] Field of Search ...... 178/5.4 R, 5.4 BD, 5.4 EL, 178/7.3 D, 7.1; 250/211 J; 358/48

[56] References Cited

UNITED STATES PATENTS 3,617,753 11/1971 Kato et al. .............................. 250/211 J

*Primary Examiner*—Richard Murray

*Assistant Examiner*—R. John Godfrey

[57] ABSTRACT

A semiconductor color target for a single color image pick-up tube incorporated in a single substrate has three different conversion elements having first and second PN-junctions, respectively. The depth of the first junction from the surface is maintained constant regardless of colors, but the depth of the second junction is varied in accordance with the element so as to enable the specified element to have a peak spectrum sensibility to Blue, Green, or Red. Conventional three different color image pick-up tubes can be replaced with a single color tube with the color target according to the present invention.

10 Claims, 12 Drawing Figures

COLOR TARGET AND METHOD OF MANUFACTURING SAME

The present invention relates to a color target, particularly to a target for a color image pick-up tube which does not use color filters and method of manufacturing same.

In the conventional target for a color image pick-up tube a photo-electric conductive material is used as a target and non-color filters are arranged on the surface at the illuminating side thereof, which pass only Green (G), Red (R), and Blue (B) respectively components of incident light. In this manner G, R, and B are converted into electrical signals in the corresponding pictures elements and then each color signal is recognized, thus producing color pictures. However, according to this technique there are some difficulties in manufacturing effective color filters which pass, respectively, only G, R, or B components and also in arranging a plurality of them in an alignment.

A main purpose of the present invention is to provide a new color image pick-up tube target in which photo-electric conversion elements sensitive to G, R, and B components of incident light are used as conversion elements which form the picture elements without necessity of the three color filters on a target surface.

An object of the present invention is to provide a color image pick-up target without using color filters.

An object of the present invention is to provide a color image pick-up target in which photo-electric elements having selective sensibilities for each of R, G, and B components of incident light are formed on a single semiconductor wafer.

A still another object of the present invention is to provide a color image pick-up target which is free from burn on the surface thereof.

A still further object of the present invention is to provide a color image pick-up target.

A further object of the present invention is to provide a color image pick-up tube having the single color target and scanning means for reproducing color signals from the target.

A still further object of the present invention is to provide a method for manufacturing the target.

Figure 1:
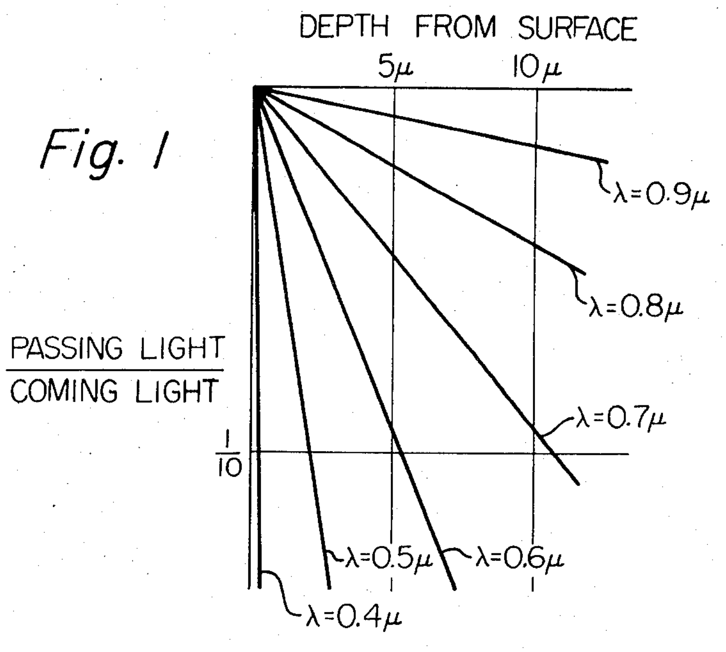
Figure 3:
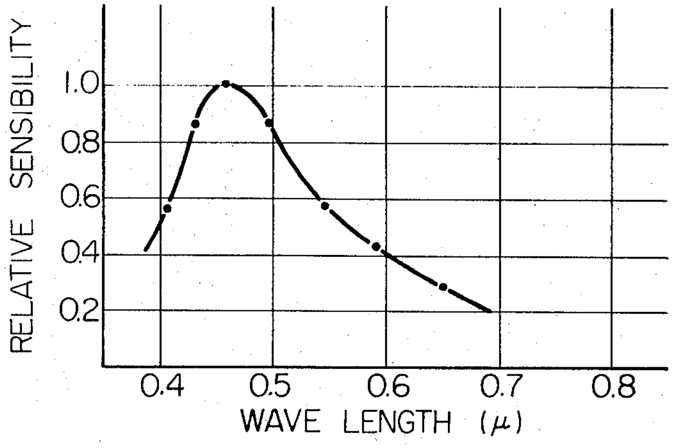
Figure 2:
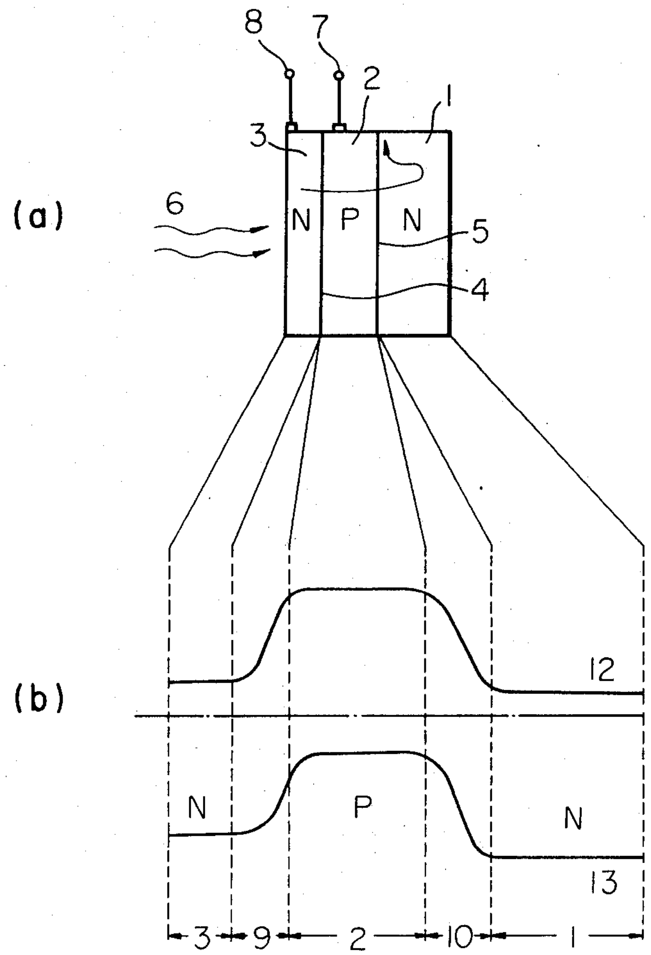
Figure 2:
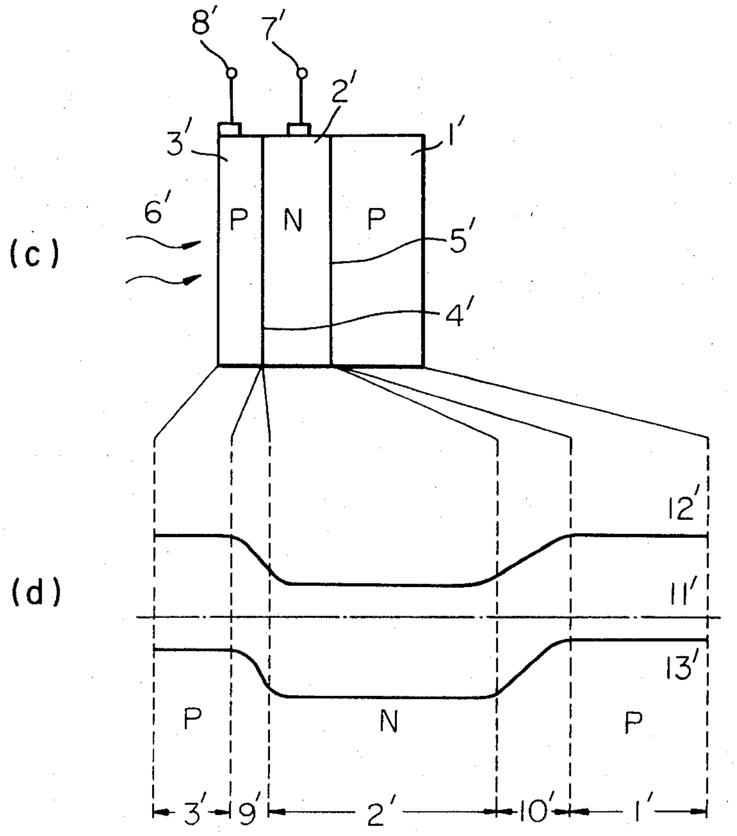
Figure 4:
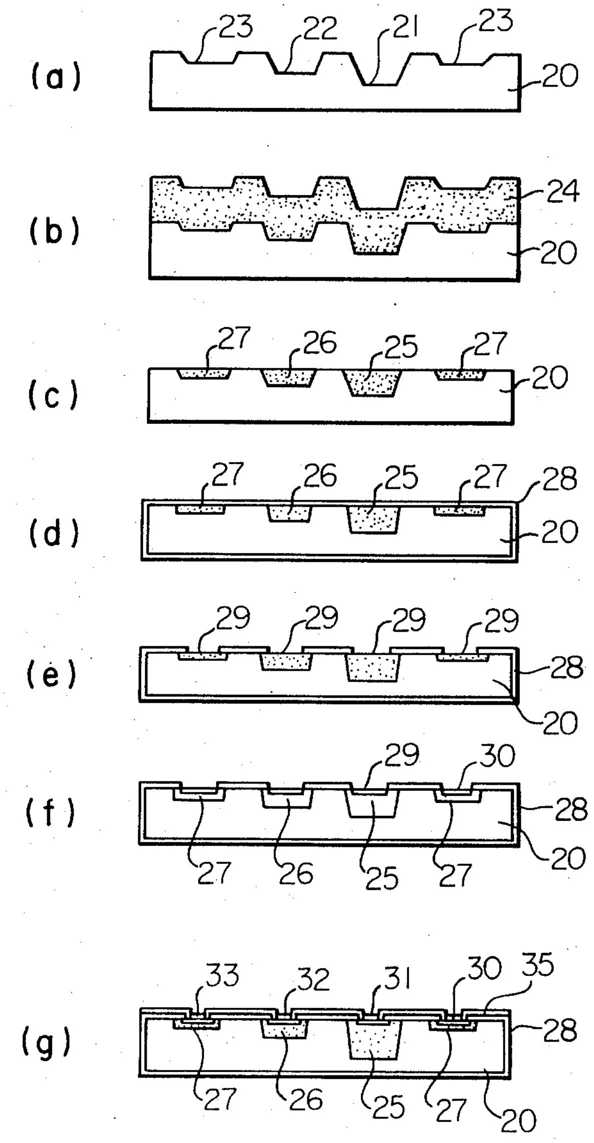
Figure 5:
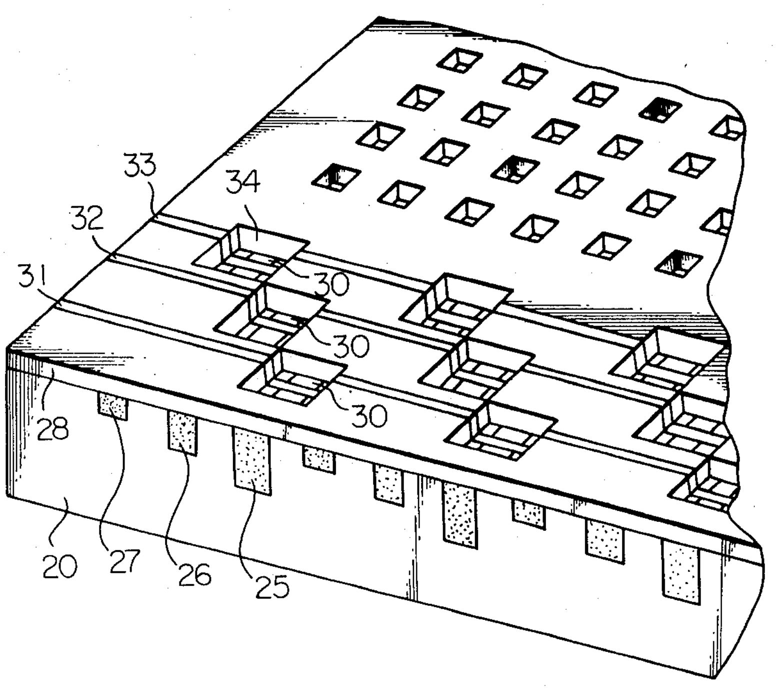
Figure 6:
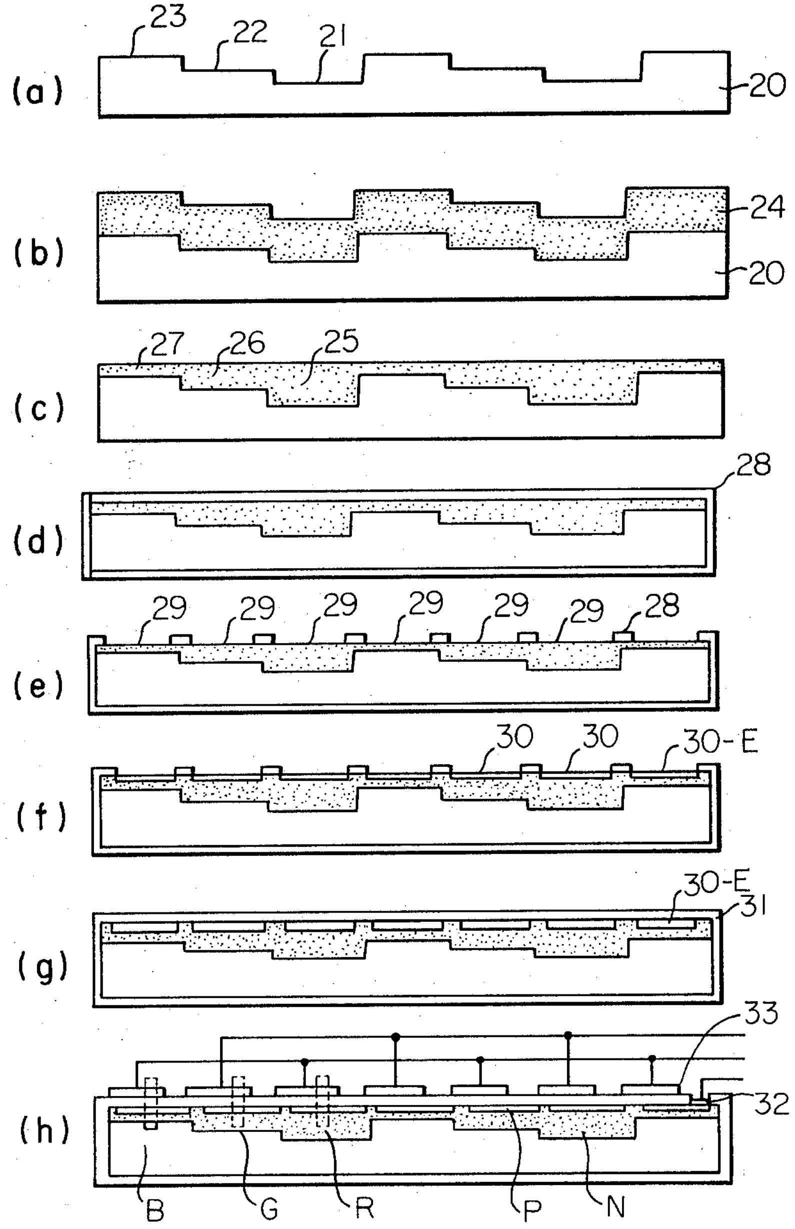
Figure 7:
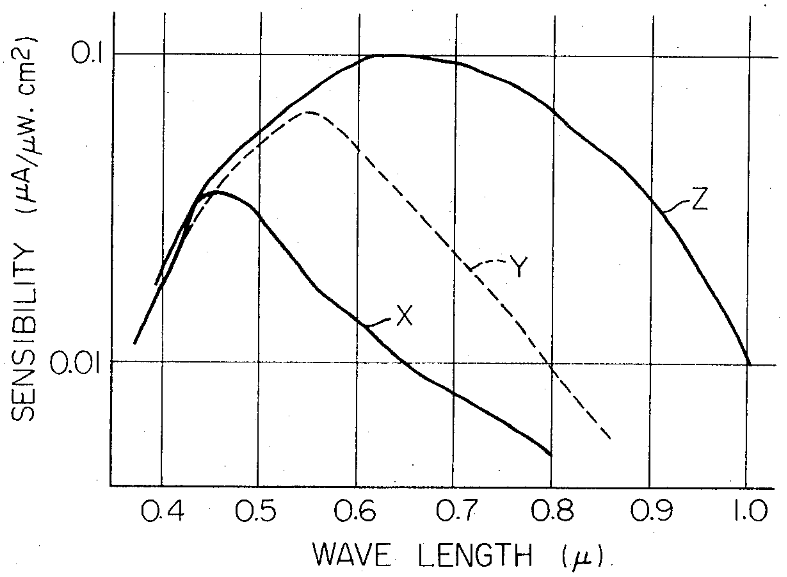
Figure 9:
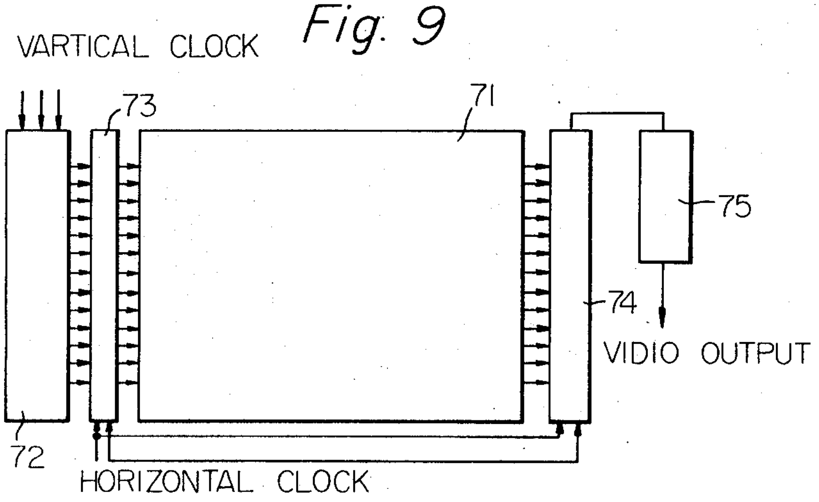
Figure 8:
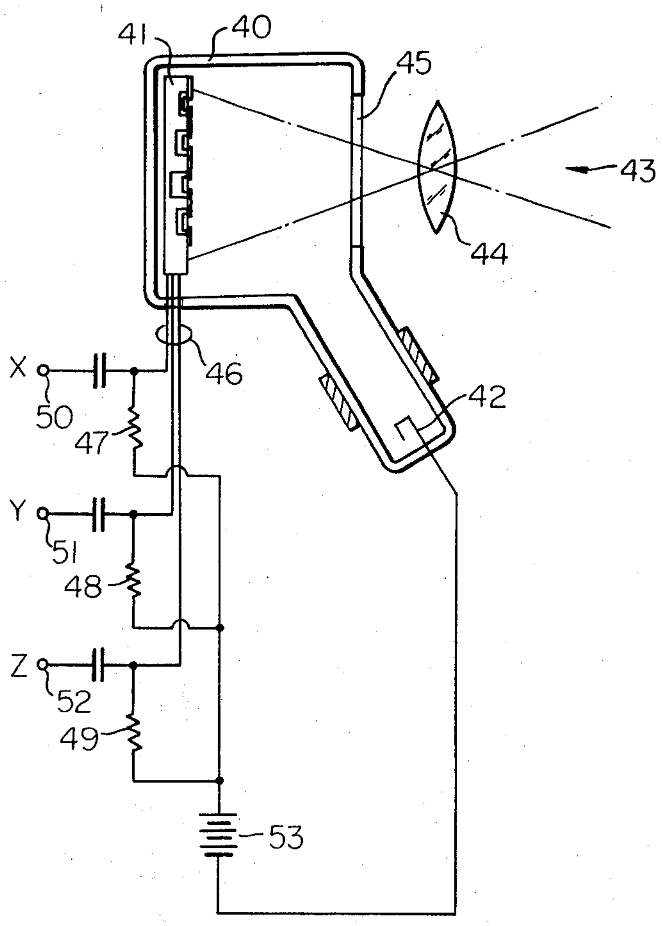

These and other purposes and advantages and features of the present invention will become apparent from the following description in conjunction with the accompanying drawings in which:

FIG. 1 shows a diagram showing a relationship between permeability of light waves and depth from the surface, FIG. 2(*a*) shows a fundamental construction of a solid state N-P-N photo-electric conversion element according to the present invention, FIG. 2(*b*) shows a characteristic of energy band of FIG. 2(*a*), FIG. 2(*c*) shows a fundamental construction of P-N-P photo-electric conversion element according to another embodiment of the present invention, FIG. 2(*d*) shows a characteristic of energy band of FIG. 2(*c*), FIG. 3 shows a spectrum characteristic of the element according to FIG. 2(*a*), FIG. 4 shows a process of manufacturing a color target according to one embodiment of the present invention, FIG. 5 shows a perspective view of the target of FIG. 4 according to the present invention, FIG. 6 shows another process of manufacturing a color target according to another embodiment of the present invention, FIG. 7 shows a characteristic of spectrum of target according to one embodiment of the present invention, FIG. 8 shows a color image pick-up circuit according to the present invention, and FIG. 9 shows a block diagram of a scanner for use with a target according to the present invention.

Heretofore, a semiconductor photo-electric conversion element by use of PN-junction is known. In this element, minority carrier generated by illumination of light reaches an electrode through the PN-junction by turning into a majority carrier, thus obtaining a signal current. In order to effectively convert incident light into an electric energy in the PN-junction semiconductor photo-electric conversion elements, it is necessary that;

(1) incoming light rays must be effectively projected on to the conversion element so as to produce electronhole pairs, (2) the minority carrier produced by the light energy must be passed through the PN-junction without dissipation.

In the meantime the light absorption at the time when a light ray is projected to a substance depends generally on wavelength of the light ray and a light ray having a short wave length is absorbed in the vicinity of the surface while a light ray having a long wave length is absorbed at a deep region of the substance.

FIG. 1 illustrates the place where light energy is converted into electron-hole pairs, i.e. the condition of absorption with respect to absorption coefficient of silicon to visible light sensibility. In the figure, 90 percent of the incoming light energy is absorbed up to the distance of 5 microns from the surface for the light ray having a wave length of 0.6 microns. It is to be noted, therefore, that visible light with shorter wave length is converted into carrier near the surface of the crystal while visible light with longer wave length and the light rays near the infrared light range are converted into carrier inside of the crystal. From this fact, it is noted that by controlling the place where the various components of the incident light are absorbed and also the place where the carrier resulting from the absorption transverses effectively across the PN-junction, the photoelectric conversion elements, each of which has a particular peak wave sensibility for Red, Green, or Blue can be made.

In the present invention, a combination of the three different photo-electric conversion elements thus produced enables a target to have particular sensibilities to R, G and B components of the incident light.

Now an explanation is made to a photo-electric conversion element which is sensitive only to Blue, for example. In the element the first PN-junction is formed in the place near to the surface to which the incoming light is projected, where the conversion takes place. The second PN-junction is formed inside of the crystal, which functions as an internal potential field for removing unnecessary carrier produced by the light component with a long wave length.

In FIG. 2(*a*), a fundamental construction of the conversion element sensitive to Blue in accordance with one embodiment of the present invention is shown. Here, an explanation is made to NPN element. On the N-type silicon substrate 1 are formed a P-type silicon layer 2 having thickness of 2 microns which is formed by the epitaxial grown method. The N-type silicon layer is formed by diffusion and has thickness of about 0.3 microns. The first PN-junction 4 is formed between P-layer 2 and N-layer 3, and the second PN-junction 5 is formed between N-substrate 1 and P-layer 2. The electrodes 7 and 8 are taken out of the surface of N-type layer 3 and P-layer 2, respectively. In the element a light ray 6 is directed from the left to the right, so that in this case N-layer 3 is illuminated. The first PN-junction 4 formed near to the surface of the element is utilized for a photo-electric conversion.

As it is difficult to form a junction very close to the surface by the present semiconductor technique, the components among the visible light rays below the wave length of 0.6 microns are converted into electrical signals in the vicinity of the first junction 4, and the components with long wave length and in the infrared light range are converted at a deep place passed through the first PN-junction 4. Consequently, most of the conversion for incident light components with a long wave length is carried out by the minority carrier which is produced at the deep place from the surface and is diffused back to the first PN-junction 4 when it transverses the junction 4. Two electrodes 7 and 8 are provided at P-type layer and N-type layer, respectively.

In this case, in order to prevent the diffused back minority carrier from passing through the first PN-junction 4 the second PN-junction 5 is provided so that the undesired minority carrier is led to the second junction 5 and to reduce the sensibility for the light component with a long wave length.

In FIG. 2(*b*), there is shown a characteristics of energy band of the element of FIG. 2(*a*), which has Fermi level 11, conduction band 12, and filled band 12. The two depletion layers 9 and 10 are located between the N-layer 3 and P-layer 2, and P-layer 2 and N-substrate 1, which correspond to each of the layers of FIG. 2(*a*). In the N-P-N construction, since the electrodes 7 and 8 are taken out of the layers 3 and 2, so that only the carrier which transverses the depletion layer 9 contributes to a signal current. The minority carrier (holes) which is optically produced in the N-layer 1 remains in the filled layer of P-layer 2 and never transverses the depletion layer 9. In other words, the carrier produced at deeper places in N-substrate 1 do not contribute to current flow. Only the carrier produced at the place near to the junction 4 of the P-layer 2 and N-layer 3 contributes to the current. N-P-N construction has been explained in the above case, but the same holds true of P-N-P construction.

In FIG. 2(*c*), there is shown a P-N-P photoelectric conversion element, wherein the same numerals of FIG. 2(*a*) are used for P-substrate, N-layer, and P-layer with the exception that suffix (') is added. FIG. 2(*d*) shows a characteristic of energy band of FIG. 2(*c*). The two depletion layers corresponding to those of FIG. 2(*b*) are also shown.

In order to make an element which is sensitive only to Blue and is not sensitive to Green and Red components of light, the second junction 5 should be formed at the place with a distance of 2 to 4 microns from the surface. The depth of the first junction is made constant within 0.3 microns – 0.5 microns irrespective of colors to be received. The spectrum characteristic of this element is shown in FIG. 3.

Next, in order to make a conversion element which has a maximum sensibility to Green and is not substantially sensitive to Red the second PN-junction 5 should be formed at deeper place so as to allow the element to have much sensibility to the components of light with long wave lengths. In this case the depth of the second junction may be 5 to 7 microns from the surface. The depth of the first junction is same as in the case of Blue element as described already.

Likewise, in order to make an conversion element sensitive to Red, the depth of the second junction 5 may be 10 to 12 microns from the surface.

As described in the present invention the three different types of the conversion elements, such as the element having a peak spectrum sensibility to Red, the element having a peak to Blue and the element having a peak to Green can be made by varying the distance from the surface of the element to the second junction. From this fact, a color target for a single image pick-up tube can be made by arranging each of the three different elements and by incorporating then in a single semiconductor substrate.

In FIG. 4, a process for manufacturing the color target is illustrated. A single crystal P-type silicon 20 having 50 $\phi$ and 1/100Ω-cm is engraved to form different grooves corresponding to each conversion depths of Green, Red, and Blue. The groove 21 corresponding to Red has a depth of 12 microns, the grooves 22 to Green has a depth of 7 microns, and the groove to Blue has a depth of 4 microns (FIG. 2(*a*)). The width of the groove is 15 microns and the pitch thereof is 60 microns.

The crystal element illustrated in FIG. 4 is for explanation only, so that the relative length is not exact. The silicon crystal film doped with As, namely the epitaxial grown layer 24 having a relative resistance of 0.1Ω-cm is formed all over the surface by 15 microns (FIG. 2(*b*)). Next, the epitaxial grown layer 24 is removed from all over the surface 17 microns by a chemical etching and the surface is made flat as much as possible (FIG. 2(*c*)). Accordingly, each of the stripped regions 25, 26 and 27, which are epitaxial layers, has 15 microns in width respectively. The depth of each of region is 10 microns for Red, 5 microns for Green, and 2 microns for Blue. The next process is to coat and oxide silicon film 28 of 3000 A on all over the surface through thermal-oxiding method (FIG. 2(*d*)). At the center of each strip the opening 29 of $SiO_2$ having 5 square microns is formed at the pitch of 15 microns by means of photo-resist etching (FIG. 2( *e*)).

Then, P-region 30 is formed by heating it under boron vapor or boron composition vapor at about 1000°C and also by diffusing the opening of $SiO_2$ into islands 30 (FIG. 2(*f*)). The depth of PN-junction is 0.5 microns. When the density of the surface is high, the sensibility to shorter wave length tends to deteriorate, so that the boron surface density should be $10^{19}$ – $10^{20}$ $cm^3$. After removing the boron glass layer which is formed at the time of boron diffusion the electrodes 31, 32 and 33 are taken out of the N-type regions 25, 26 and 27 which correspond to R, G and B (FIG. 2(*g*)) and are connected to the N-type strip.

The aluminium is used for the wire electrodes. Final step is to evaporate a semiconductor 35, by means of, such as trisulfide antimony on all over the surface 300 A in order to prevent the $SiO_2$ film from changing by electrons emitted due to electron current (FIG. 2(*g*)).

In FIG. 5, there is shown the target thus produced, where the same numerals are used.

In FIG. 6, another process of manufacturing the target is shown. In this process, the groove for R has a depth of 8 microns, the groove for G has 3 microns and no groove is formed for B (FIG. 6(*a*)). The width of the groove is 60 microns and the pitch is 60 microns. The epitaxial grown layer 24 is formed 15 mircons on all over the surface (FIG. 6(*b*)).

Next, the epitaxial layer is removed from the surface uniformly as much as possible by chemical etching, leaving 2 microns of the epitaxial layer in thickness at the thinest point (FIG. 6(*c*)). The regions corresponding to R, G, and B are 10.5 and 2 microns respectively.

Next, a silicon oxide film 28 is formed about 3000 A on all over the silicon surface by thermal oxiding method (FIG. 6(*d*)). The $SiO_2$ opening in the form of square of 30 microns is formed at the center of each strip (FIG. 6(*e*)). The opening is formed by photo etching method. The silicon opening is further heated under boron vapor at the temperature of 1000°C and boron is diffused into the opening and P-type regions 30 are formed (FIG. 6(*f*)). The depth of the junction is 0.5 microns. When the diffused density of the surface is high the sensibility to the components of light having a shorter wave length is deteriorated, so that the boron surface density must be $10^{19}$ – $10^{20}$/ $cm^3$.

The next process is to remove a silicon oxide film including boron glass by a chemical etching method. After that a silicon oxide film 31 is grown 2000 A on all over the surface of the substrate by heat-oxiding method (FIG. 6(*g*)). Then, a plurality of holes are provided on the silicon oxide film of the P-type final island regions 30-E and the output terminal electrode 32 and the charge transfer electrode 33 are provided by photoresist etching (FIG. 6(*h*)).

In the foregoing example, the distance from the crystal surface to the second junction is changed so as to give each of the elements of R, G and B a particular sensibility to the colors and the N-type regions 25, 26 and 27 should be made different respectively through chemical etching, epitaxial method, or chemical etching techniques. Namely, aluminium is diffused on a flat P-type substrate on the region corresponding to Green, and boron is selectively diffused on the region to Blue. No diffusion is made to Red element. N-type epitaxial is grown thereon. During the epitaxial growing aluminium and boron in the regions are diffused into the epitaxial layer. Aluminium is faster than boron in diffusion speed. The distance from the surface of grown layer to the first junction and each of the growing times are defined as follows;

10 microns for Red
5 microns for Green
2 microns for Blue

The peak of the X-cell spectrum sensibility resides in the light wave length of 0.45 and the sensitivity is 0.034 $\mu A/\mu W\ cm^2$. The peak of the Y-cell spectrum sensibility resides in 0.55 micron and the light sensitivity is 0.062 $\mu A/\mu W\ cm^2$.

The light sensibility of Y-cell at the light wave length of 0.45 microns is approximately equal to that of X cell of 0.45 microns-wave length. The peak of Z-cell spectrum sensibility resides in 0.65 microns and the light sensibility thereof is $0.1 \mu A/\mu W\ cm^2$. The light sensibility of the two cells for 0.45 microns and 0.55 microns is equal to the light sensibility of X cell and Y cell. In FIG. 7, there is shown a characteristic of spectrum sensivilites of the three different elements X, Y and Z, each having a maximum spectrum sensibility for Red, Green and Blue. Accordingly, the relationship expressed by the following equations.

$$Z = R + G + B$$
$$Y = G + B$$
$$X = B \quad (1)$$

Therefore, each component of R, G and B is expressed by the following equations from the spectrum light sensibility characteristics of X, y and Z.

$$B = X$$
$$G = Y - X$$
$$R = Z - Y \quad (2)$$

With respect to the light sensibility of the silicon P-N junction diode, the following equation is theoretically established.

$$R \approx G \approx B \quad (3)$$

However, the actual light sensibility of the diode measured was turned out to be the following.

$$R > G > B \quad (4)$$

The reason for this will be derived from the following:

1. The shorter the wave length becomes, the larger the reflective efficiency of silicon surface becomes.
2. The shorter the wave length of light becomes, the more the minority carrier is generated at the place near to the surface and the larger the probability of extinction due to recombination at the surface becomes.

Accordingly, in order to allow equation (4) to be approximate to equation (3), the following process is required;

1. An anti-reflection film is evaporated on the silicon surface. For example, SiO is coated by about 500 A.
2. Crystal defects should not be made on the light incoming surface of silicon.

When each of the X, Y and Z-cell on a single silicon substrate is scanned by electron beam, X, Y and Z cells are sampled and corresponding outputs are produced and an arithmetic operation as shown in equation (2) is carried out in an arithmetic circuit. When R, G and B have an equal light intensity, equation (4) is established, so that it is necessary to adjust the signals to adapt to human visual sensibility.

Accordingly, the circuit for correcting the signals should carry out an operation including R, $a$G, $\beta$B, where $a$ and $\beta$ are coefficient respectively.

Referring to FIG. 8, there is shown one embodiment of the single color image pick-up tube with the target. In the figure, the image pick-up tube 40 is an iconoscope type tube which comprises the color target 41 which is scanned by electron beam emitted from the cathode 42 and deflected by the well-known technique in accordance with the scanning frame line. Since the cathode 42 is suitably displaced in a position the image 43 is passed through the lens 45 and through the transparent portion 45 of the tube to reach the target 41 to be scanned by electron beam, where the image is directly focused.

The carriers in the target as the result of illumination are taken out as an electric current when the beam reached the target and the output voltages are generated across the output resistor 47, 48 and 49. The output voltages are taken out from the terminals 50, 51, 52 as X signal, Y signal, and Z signal respectively. Numeral 53 shows a bias source.

In the foregoing description reference is made to the case in which light is projected from the first junction. However, when light is introduced from the second junction or substrate the characteristic of voltage becomes the one in which the shorter wave length is cut and X-cell comes to include. Signal having R, G and B while Y-cell comes to includes a signal having R and G, and Z cell includes only R.

FIG. 9 shows blockdiagram of a scanning means having a photo-electric conversion matrix 71 such as shown in FIG. 5, vertical scanning signal generator 72, transfer gate 73 output resistor 74 and output amplifier 75. When the electric charges accumulated in the matrix are desired to be transferred, the generator 72 operates the particular transfer gate 73 to be scanned, and the charges are transferred to output resistor 74. In this case, when horizontal clock pulses are applied the charges are moved successively into output amplifier 75.

It is to be noted that the effects and advantages according to the present invention will be;

1. The color image pick-up tube can be made a single tube, (2) the color filters and signal index can be dispensed with, (3) the target is easily manufactured by the present integral circuit techniques such as silicon planar technique, so that the target is economical and is suitable for a mass production as well as it has a good stability, (4) since the target is a single crystal, spot is prevented from burning out and value of $\gamma$ of image is nearly 1.

It is to be noted that the present invention is not to be limited to the exact construction shown and described and that various changes and modifications may be made without departing from the spirit and scope of the invention.

What is claimed is:

1. A semiconductive photoelectric converting device comprising a semiconductive substrate of one conductivity type having a light-receiving surface, a plurality of separate first p-n junctions juxtaposed in said substrate at a predetermined depth from said surface, and a plurality of separate second p-n junctions equal in number as said first p-n junctions and spaced therefrom at different depths from said surface corresponding to the red, green and blue components respectively of light incident on said surface.

2. The device as claimed in claim 1, wherein said semiconductive substrate is silicon.

3. The device as claimed in claim 2, wherein said predetermined depth is from 0.3 to 0.5 microns.

4. The device as claimed in claim 2, wherein said different depths range from 2 to 12 microns.

5. The device as claimed in claim 1, wherein said light-receiving surface is coated with a film of silicon dioxide.

6. A television camera tube comprising an evacuated envelope, a faceplate at one end thereof, an electron gun at the other end to provide an electron beam towards said faceplate, a semiconductive photoelectric converting device as claimed in claim 12 mounted on the inner surface of said faceplate, means coupled to said device and deriving electrical signals when the carriers generated at different depths from the light receiving surface of said device by the light incident thereon traverse said p-n junctions thereof, said electrical signals including a first signal corresponding to the full light wavelength range of visible spectrum, a second signal corresponding to two of the primary color components in said wavelength range and a third signal corresponding to one of said two color components, a first subtracting circuit for subtracting said second signal from said first signal to derive a first color signal, and a second subtracting circuit for subtracting said third signal from said second signal to derive a second color signal, said third signal being a third color signal.

7. A method for fabricating a photoelectric converting device as claimed in claim 1, comprising the steps of forming parallel grooves at different depths corresponding to the red, green and blue components respectively of light into a semiconductive substrate of one conductivity type, growing an epitaxial layer on said substrate, etching said layer to provide a uniform surface, coating a film of silicon dioxide on said surface, etching said silicon dioxide film to provide a plurality of windows, and diffusing boron through said windows into said epitaxial layer.

8. The method as claimed in claim 7, wherein said grooves have a depth of about 4 microns for the blue component, a depth of about 7 microns for the green component and and depth of about 12 microns for the red component.

9. The method as claimed in claim 7, wherein said boron is diffused at a temperature of about 1000°C.

10. The method as claimed in claim 7, wherein said parallel grooves have a step-like shape in cross section.

* * * * *